(12) United States Patent
Perrier et al.

(10) Patent No.: US 10,662,776 B2
(45) Date of Patent: May 26, 2020

(54) ASSEMBLY ON A SHAFT OF A TURBOMACHINE OF A BLADED ROTOR DISC AND OF A ROTOR OF A LOW PRESSURE COMPRESSOR HAVING AT LEAST TWO MOBILE NOZZLE STAGES

(71) Applicant: SAFRAN AIRCRAFT ENGINES, Paris (FR)

(72) Inventors: Mathieu Laurent Louis Perrier, Moissy-Cramayel (FR); Nils Edouard Romain Bordoni, Moissy-Cramayel (FR); Gilles Alain Marie Charier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 107 days.

(21) Appl. No.: 15/984,966

(22) Filed: May 21, 2018

(65) Prior Publication Data
US 2018/0334907 A1    Nov. 22, 2018

(30) Foreign Application Priority Data

May 22, 2017    (FR) ...................................... 17 54521

(51) Int. Cl.
*F04D 29/20*        (2006.01)
*F01D 5/02*         (2006.01)
(Continued)

(52) U.S. Cl.
CPC .............. *F01D 5/025* (2013.01); *F01D 5/026* (2013.01); *F01D 5/066* (2013.01); *F01D 5/34* (2013.01); *F02K 3/06* (2013.01); *F04D 29/054* (2013.01); *F04D 29/20* (2013.01); *F04D 29/263* (2013.01); *F04D 29/266* (2013.01); *F05D 2230/60* (2013.01); *F05D 2240/60* (2013.01); *F05D 2260/31* (2013.01); *F05D 2260/4031* (2013.01)

(58) Field of Classification Search
CPC ........ F01D 5/025; F04D 29/20; F04D 29/263; F04D 29/266; F05D 2260/4031
See application file for complete search history.

(56) References Cited

U.S. PATENT DOCUMENTS 6,149,380 A     11/2000 Kuzniar et al.
6,375,421 B1 *  4/2002 Lammas ................. F01D 5/005
                                                    415/199.5

(Continued)

FOREIGN PATENT DOCUMENTS

FR    2 913 734 A1     9/2008
WO    WO 00/46489 A1   8/2000

OTHER PUBLICATIONS

French Preliminary Search Report dated Feb. 5, 2018 in Patent Application No. 1754521 (with English language translation of categories of cited documents).

*Primary Examiner* — Ninh H. Nguyen
(74) *Attorney, Agent, or Firm* — Oblon, McClelland, Maier & Neustadt, L.L.P.

(57) ABSTRACT

An assembly includes a one-piece bladed disk, at least one low-pressure compressor rotor, and a low-pressure compressor shaft. The bladed disk and the low-pressure compressor rotor are both adapted to be shrunk onto the low-pressure compressor shaft and mechanically attached to it by sets of splines. At least one clamping member blocks axially the different collars with respect to the shaft.

7 Claims, 2 Drawing Sheets

(51) Int. Cl.
    *F01D 5/34*     (2006.01)
    *F04D 29/26*     (2006.01)
    *F01D 5/06*     (2006.01)
    *F02K 3/06*     (2006.01)
    *F04D 29/054*     (2006.01)

(56) References Cited

U.S. PATENT DOCUMENTS

| | | | |
|---|---|---|---|
| 9,353,626 B2* | 5/2016 | Eleftheriou | F04D 29/266 |
| 9,410,427 B2* | 8/2016 | Giannakopoulos | F01D 5/025 |
| 2008/0226458 A1 | 9/2008 | Pierrot et al. | |
| 2013/0323077 A1 | 12/2013 | Giannakopoulos | |
| 2016/0069207 A1* | 3/2016 | Bois | F01D 5/025 |
| | | | 416/204 R |

* cited by examiner

ASSEMBLY ON A SHAFT OF A TURBOMACHINE OF A BLADED ROTOR DISC AND OF A ROTOR OF A LOW PRESSURE COMPRESSOR HAVING AT LEAST TWO MOBILE NOZZLE STAGES

The present invention relates to an assembly to a turbomachine shaft of at least one one-piece bladed disk and of a low-pressure compressor rotor including at least two stages of movable blades.

It finds application advantageously in the case of double flow aircraft turbojets.

GENERAL TECHNICAL FIELD AND PRIOR ART

Conventionally, the bladed disk of the fan of a turbomachine and the rotor of its low-pressure compressor are attached to the shaft of the low-pressure compressor by different flange systems. One example in that respect is described by patent application FR2926603, in which the low-pressure compressor is attached to the bladed disk, while it is attached for its part to the low-pressure shaft. The different attachments are attachments using flanges. The bladed disk is of the type with pinned blades.

Already known furthermore are fan assemblies in which the bladed disk is mounted on its shaft by attachments using splines. Such an assembly is for example illustrated by the patent application FR2913734, which also relates to a bladed disk structure with pinned blades.

Another splined assembly solution is presented in patent application WO 00/46489.

The structure proposed in this application remains cumbersome and does not allow a low-pressure compressor with several stages of movable blades, yet with a low hub ratio, to be contemplated.

Yet for certain applications, and in particular in the case of engines with small diameters, it is desirable to have fans having a low hub ratio as well as an increased compression ratio thanks to the use of a compressor with multiple stages.

Furthermore it will be noted that in the case of turbomachines with low-pressure compressors having several stages, the solutions known at present with a one-piece bladed disk are not fully satisfactory.

The one-piece bladed disk is in fact generally difficult to disassemble because the low-pressure compressor is attached to it. Yet it is desired, to facilitate interventions on the cone or a blade of the disk, to be able to dispose of an attachment allowing particularly easy disassembly, in particular under the wing, without having to disassemble the low-pressure compressor.

Solutions with triple flanges accessible from the cone could be contemplated.

The latter, however, to facilitate disassembly, should be able to be inserted below the bore radius of the disk, which limits the reduction of the hub ratio. A reduction of the bore radius and of the installation radius of the flange would not be favorable to the mechanical strength of the flange in any case.

A solution with a flange would also not be optimal for the transmission of forces (change of slope, stress concentration, etc.).

GENERAL PRESENTATION OF THE INVENTION

A general goal of the invention is to mitigate the disadvantages of the prior art.

In particular, one aim of the invention is to propose a solution for assembling a fan with a one-piece bladed disk allowing a low hub ratio.

Another aim of the invention is to propose a fan assembly with a one-piece bladed disk which allows easy disassembly under the wing.

Another aim of the invention is to propose a fan assembly with a one-piece bladed disk which is reliable in terms of mechanical strength.

Thus, according to a first aspect, the invention proposes a one-piece bladed disk of a turbomachine fan, comprising a plurality of blades which are made in a single part with a disk portion, said disk portion being adapted to be shrunk onto a low-pressure compressor shaft, characterized in that said disk portion comprises a profiled body with a generally frustoconical shape and an attachment web which extends as a truncated cone inside the body, from a median zone of it, downstream, said attachment web terminating in a cylindrical splined collar which is designed to be engaged in a corresponding zone of the shaft and to cooperate with complementary splines of said shaft to block the relative rotation of said shaft and of said collar and including a heel which protrudes, upstream of said attachment collar, as well as a support zone which terminates the collar downstream of the splines, the heel and said support zone being configured to ensure on the one hand, with complementary zones of the shaft, cylinder/cylinder support and on the other hand, with the complementary zones of an upstream clamping member and of a heel of a cylindrical collar of a low-pressure compressor rotor downstream, axial supports upstream and downstream of the splines.

Such a fan structure allows the fan to be brought considerably closer to the compressor and allows a low hub ratio, including the case where the low-pressure compressor rotor comprises several stages of movable blades.

According to a second aspect, the invention relates to a low-pressure compressor rotor of a turbomachine adapted to be shrunk onto a low-pressure compressor shaft, said low-pressure compressor shaft including a set of splines and a support zone, said low-pressure compressor rotor including:

an attachment collar including a set of splines adapted to cooperate with a set of splines of the low-pressure compressor shaft, in order to block the relative rotation of the attachment collar with respect to the low-pressure compressor shaft when the rotor of the low-pressure compressor is shrunk onto the low-pressure compressor shaft,
a heel which protrudes upstream of said attachment collar,
a downstream support zone configured to cooperate with a complementary support zone of the low-pressure compressor shaft to ensure a cylinder/cylinder support which ensures that the rotor of the low-pressure compressor and the low-pressure compressor shaft are coaxial, characterized in that said low-pressure compressor rotor includes at least two stages of movable blades and in that the support zone is configured to also ensure axial support with a shoulder on the shaft.

According to a third aspect, the invention relates to a low-pressure compressor shaft including:

several sets of splines designed to cooperate with complementary splines of a one-piece bladed disk and with at least one low-pressure turbomachine compressor rotor,
at least one clamping member designed to be installed at the upstream end of the shaft to ensure axial support on a heel which protrudes upstream of an attachment collar of the one-piece bladed disk, the latter itself being supported on a protruding heel and upstream of an attachment collar of the low-pressure compressor rotor, said clamping member and the support that it provides being adapted to block axially the different collars with respect to the shaft, characterized in that it includes a shoulder configured to ensure axial support with a support zone of a collar of a low-pressure compressor rotor according to the second aspect.

According to a fourth aspect, the invention relates to an assembly including a one-piece bladed fan disk, at least one low-pressure compressor rotor and a low-pressure compressor shaft, characterized in that the bladed disk and the low-pressure compressor rotor are both adapted to be shrunk onto the low-pressure compressor shaft and attached mechanically to it by:

- sets of splines provided on the one hand on attachment collars of said one-piece bladed disk and said compressor rotor, and on the other hand on said low-pressure compressor shaft, said sets of splines blocking the relative rotation of the collars with respect to the compressor shaft,
- at least one clamping member designed to be installed at the upstream end of the shaft to ensure axial support to a heel which protrudes upstream of the attachment collar of the one-piece bladed disk, the latter being itself supported on a protruding heel upstream of the attachment collar of the low-pressure compressor rotor, said clamping member and the support that it provides blocking the different collars axially with respect to the shaft.

The one-piece bladed disk can be a one-piece bladed disk according to the first aspect. The low-pressure compressor rotor can be a low-pressure compressor rotor according to the second aspect, and can include at least two stages of movable blades. The low-pressure compressor shaft can be a low-pressure compressor shaft according to the third aspect, and can include a shoulder configured to provide axial support with a support zone of a collar of the low-pressure compressor rotor.

With such an attachment, a structure exists which is both a one-piece bladed disk and a multi-stage low pressure compressor and which does not have the disadvantages of the structures with a one-piece bladed disk.

This attachment is in fact compatible with a low hub ratio. It allows easy disassembly of the bladed disk.

The bladed disk and the low-pressure compressor rotor each include for example

- an attachment collar with splines designed to cooperate with a set of complementary splines of the low-pressure compressor shaft, so as to ensure the connection in rotation of the bladed disk and the rotor with respect to the shaft
- a support heel upstream of it, and an axial support zone cooperating with corresponding zones of the shaft, in order to ensure that they are coaxial.

Likewise, the different sets of splines distributed on the low-pressure compressor shaft can be stepped on different diameters of the shaft, the different attachment collars and their splines having complementary dimensions.

A clamping member can be a nut.

In addition, the assembly can include at least one internal spline for blocking the shaft during clamping.

The invention also has as its object a one-piece bladed disk of a turbomachine or a low-pressure compressor rotor for such an assembly. It is adapted to be shrunk onto a low-pressure compressor shaft and includes:

- a splined attachment collar;
- a heel which protrudes upstream of said attachment collar;
- a downstream support zone.

It also has as its object a low-pressure compressor shaft for such an assembly. Said shaft includes several sets of splines designed to cooperate with complementary splines of a one-piece bladed disk, and with at least one low-pressure turbomachine compressor rotor.

In particular, the sets of splines can be stepped on different diameters of the shaft.

Finally, the invention also relates to a turbomachine including such an assembly.

PRESENTATION OF THE FIGURES

Other features and advantages of the invention will still be revealed by the description that follows, which is purely illustrative and not limiting, and must be read with reference to the appended figures in which.

DESCRIPTION OF ONE OR MORE IMPLEMENTATION MODES AND EMBODIMENTS

Figure 1:
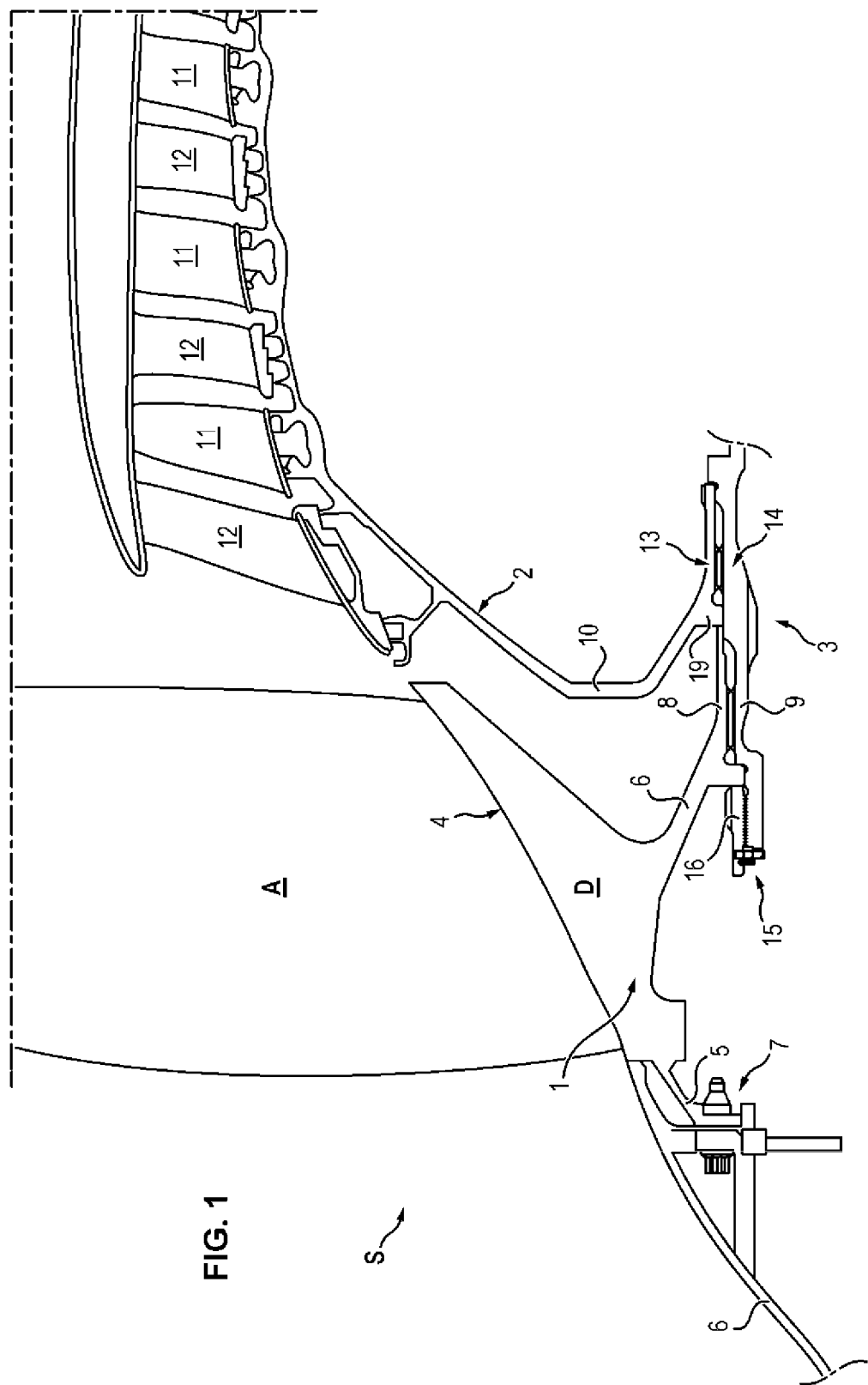
FIG. 1 is a simplified section view illustrating a possible embodiment of the invention.

Shown in FIG. 1 is a fan S at the inlet of a turbomachine, which is for example a double flow turbojet.

This fan S includes a bladed disk 1 which is mounted on the upstream portion of a low-pressure compressor shaft 3 (LP hereafter in the text) upstream of a low-pressure LP rotor 2. The LP compressor rotor 2 is itself mounted on the upstream portion of the shaft 3.

The bladed disk 1 is of the one-piece type. It includes a plurality of blades A which are formed in a single piece with a disk portion D. Said disk portion D comprises:

- a profiled body 4 with a generally frustoconical shape;
- one or more attachment flange tabs 5 which extend upstream of said body 4;
- an attachment web 6 which extends as a truncated cone inside the body 4, from a median zone of it, downstream and in the direction of the shaft 3.

The attachment tabs 5 allow the attachment of a cone C by bolting to the bladed disk 1 (attachment flanges 7).

The attachment flange 6 terminates in a splined cylindrical collar 8 which is engaged in a zone 9 of the upstream portion of the shaft 3 which includes complementary splines.

The splines of the collar 8 which terminates the attachment web 6 of the bladed disk and those of the zone 9 of the shaft 3 cooperate to ensure the connection in rotation of the bladed disk 1 and the shaft 3 of the LP compressor.

The rotor 2 of the LP compressor includes an upstream web 10 which defines a rotor disk and which carries several stages of movable blades 11 (in this particular case, three stages or more).

The LP compressor also includes several stages of straightener blades 12. The different stages of straightener blades 12 and movable blades 11 are disposed following one another, alternately, to define said compressor.

This flange 10 is terminated at the shaft 3 by a splined cylindrical attachment collar 13 engaged with a second splined zone 14 which said shaft 3 has upstream of the zone 9.

The splines of the cylinder 13 and those of the zone 14 cooperate to ensure a splined connection which blocks in relative rotation the rotor 2 and the LP compressor shaft 3.

Figure 2:
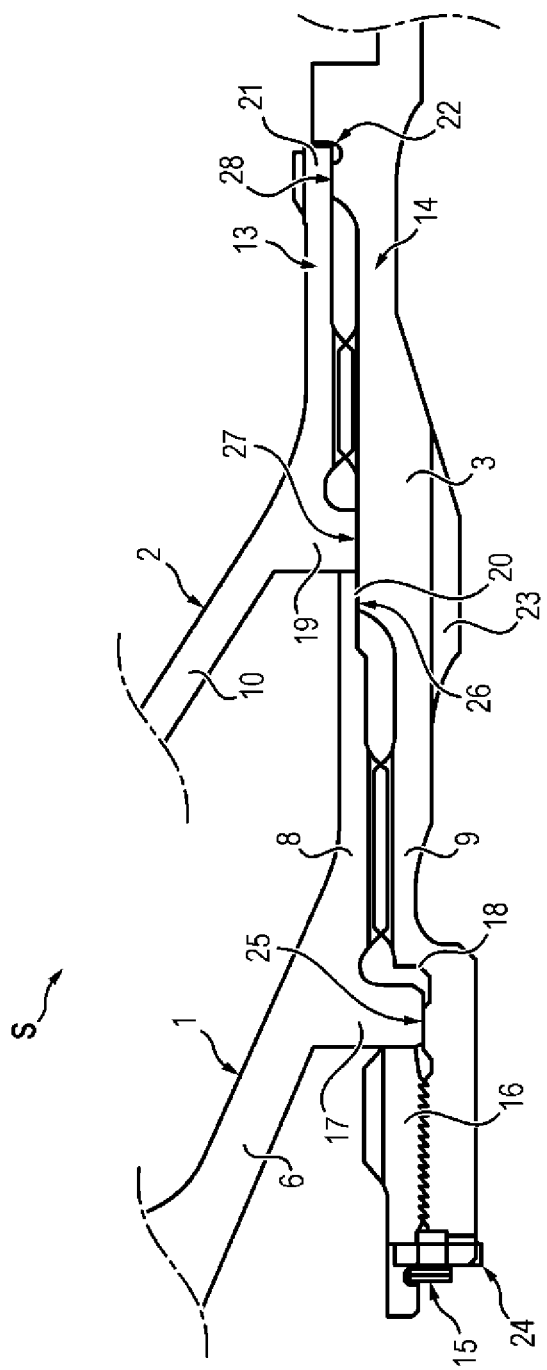
FIG. 2 is a representation of a detailed section view of the splined connections of the assembly of FIG. 1.

The splined connections between, on the one hand, the attachment collars 8 and 13 of the bladed disk 1 and of the rotor 2, and on the other hand the splined zones 9 and 14 of the shaft 3 are illustrated in a more detailed manner in FIG. 2.

As can be seen particularly on this figure, these splined connections are held in place thanks to an attachment 15 of the bolt/nut type.

In particular, this attachment 15 is ensured by a nut 16, the thread of which cooperates with a complementary thread at the upstream end of the shaft 3. This nut 16 is supported against an annular heel 17 which extends from the web 6 to the shaft 3, just upstream of the collar 8 and which protrudes with respect to said collar 8. At its opposite end, the foot 20 of the collar 8 is itself supported against a heel 19 which extends from the web 10, protruding with respect to the collar 13. The foot 20 of the collar 8 thus retains the foot 21 of the collar 13 against a shoulder 22 of the shaft 3, while a clearance exists between the annular heel 17 and the step 18 upstream of the zone 9 on the shaft 3. The interface between the foot 20 and the heel 19 serves to transfer the clamping of the nut to the collar 13 to ensure the retention of the foot 21 against the shoulder 22.

It will be noted that, to allow such an assembly, the splined zones 9 and 14 of the shaft 3 are stepped on different diameters of the shaft 3 (the splines of the downstream zone 14 being situated at a height greater than the height of the upstream zone 9).

In this manner, the one-piece bladed disk 1, like the LP compressor rotor 2, are both retained in rotation with respect to the LP shaft 3 by the sets of splines of the zones 8, 9 and 13, 14, which prevent their rotation on said shaft 3. They are retained in axial position on the shaft 3 by the nut attachment 15 and the support that they provide to the heels of the two collars 8 and 13, this support itself ensuring the retention of the foot 21 against the shoulder 22.

Furthermore, the heel 17 and the foot 20 of the collar 8 provide, with the corresponding zones of the shaft 3, cylinder/cylinder supports upstream and downstream of the zone 9 and of the splined connection accomplished there (zones 25 and 26 of the shaft 3 in FIG. 2).

Likewise, cylinder/cylinder supports are provided upstream and downstream of the zone 14 and of the corresponding splined connection, the heel 19 and the foot 21 being supported on corresponding zones of the shaft 3 (zones 25 and 26).

These different cylinder/cylinder supports at zones 25, 26 and 27, 28 make it possible to ensure that the rotor elements are properly coaxial.

One or more internal radial splines 23 can also be used to block the LP shaft 3 in rotation during clamping of the nut 16. Preferably a notched anti-rotation ring 24 also allows the nut 16 to be blocked in the clamped position.

The resulting bulk is particularly reduced and allows a low hub ratio, with good mechanical strength as regards the connection between the one-piece bladed disk 1 and the LP compressor rotor 2 on the one hand, and the low-pressure shaft 3.

Assembly is particularly simple. It is accomplished by shrinking the rotor 2 (or the different rotors 2 in the case of several stages) onto the shaft 3, then by also shrinking the one-piece bladed disk 1.

The different splined zones are then engaged to ensure blocking in rotation of the rotor(s) 2, as well as the bladed disk 1, on the shaft 3.

The nut 16 is then clamped so that the collars 8 and 13 are clamped along the shaft 3 against the shoulder 22. The notched anti-rotation ring 24 is then disposed to secure the nut 16 in the clamped position.

At the conclusion of this step, an assembly exists in which the bladed disk 1 and the multi-stage straightener rotor 2 are attached to the shaft 3 via two consecutive sets of splines and a single clamping nut 16.

Once the nut 16 is clamped and the ring 24 is in place, the cone C is mounted on the bladed disk 1 thanks to attachment flanges 7, which allow bolted attachment of the cone C on the bladed disk 1.

The proposed assembly also allows easy disassembly under the wing.

Once the cone C is withdrawn, in fact, the operator has immediate access to the nut 16.

He can then unclamp it and extract the one-piece bladed disk 1 by having it slide on the shaft 3, along the set of splines of the zone 9.

Disassembly does not in any way require the separation of the LP shaft 3 from the rest of the engine, or intervening on its upstream bearing.

Therefore the axial position of the LP shaft 3 does not need to be adjusted.

In addition, the connection between the LP compressor rotor 2 and the LP shaft 3 is in no way affected by the disassembly of the one-piece bladed disk 1, only the axial clamping of the bladed disk 1 being lost during such a disassembly.

There is also a reduced and reliable dimension chain which allows the positioning uncertainty at the blading to be limited, and therefore contributes to the aerodynamic performance of the bladed disk 1 and of the compressor. In particular, the different parts not being subjected to a hot flow or to friction, they are not subjected to differential thermal dilation between parts.

Likewise, the proposed structure allows the bearing and its downstream oil supply system to the low pressure shaft 3. The dimensional variations of the bearing (manufacture or thermal dilation), do not impact the position of the bladed disk 1 or of the LP compressor rotor. The temperature of the bearing can go up to 200° C.

Furthermore it will be noted that the proposed structure—with cylinder/cylinder guidance—is adapted for an LP compressor with at least three stages, which therefore have a sizable length and which necessitate advanced embedding quality so as not to have clearance and to have good aerodynamic performance. The upstream bearing is situated below the movable blades of the LP compressors.

The different successive splines on the LP shaft 3 have different heights to allow cylinder/cylinder supports on either side of the splined zones.

The invention claimed is:

1. A low-pressure compressor shaft including:
    several sets of splines designed to cooperate with complementary splines of a one-piece bladed disk and with at least one low-pressure turbomachine compressor rotor,
    at least one clamping member designed to be installed at the upstream end of the low-pressure compressor shaft to ensure axial support on a heel which protrudes upstream of an attachment collar of the one-piece bladed disk, the one-piece bladed disk being supported on a protruding heel and upstream of an attachment collar of the low-pressure compressor rotor, said clamping member and the support that the clamping member provides being adapted to block axially the different collars with respect to the low-pressure compressor shaft, and a shoulder configured to ensure axial support with a support zone of a collar of a low-pressure compressor rotor, wherein the low-pressure compressor rotor includes the attachment collar including a set of splines adapted to cooperate with the set of splines of the low-pressure compressor shaft, in order to block relative rotation of the attachment collar with respect to the low-pressure compressor shaft when the rotor of the low-pressure compressor is shrunk onto the low-pressure compressor shaft, the heel which protrudes upstream of said attachment collar, and a downstream support zone configured to cooperate with a complementary support zone of the low-pressure compressor shaft to ensure a cylinder/cylinder support which ensures that the low-pressure compressor rotor and the low-pressure compressor shaft are coaxial, and wherein said low-pressure compressor rotor includes at least two stages of movable blades and the support zone is configured to also ensure axial support with a shoulder on the low-pressure compressor shaft.

2. An assembly including a one-piece bladed fan disk, at least one low-pressure compressor rotor and a low-pressure compressor shaft, wherein the bladed disk and the low-pressure compressor rotor are both adapted to be shrunk onto the low-pressure compressor shaft and attached mechanically to the low-pressure compressor shaft by:

sets of splines provided on attachment collars of said one-piece bladed disk and said compressor rotor, and on said low-pressure compressor shaft, said sets of splines blocking relative rotation of the collars with respect to the low-pressure compressor shaft, at least one clamping member designed to be installed at the upstream end of the low-pressure compressor shaft to ensure axial support to a heel which protrudes upstream of the attachment collar of the one-piece bladed disk, the one-piece bladed disk being itself supported on a protruding heel upstream of the attachment collar of the low-pressure compressor rotor, wherein the clamping member and the support that the clamping member provides blocks the different collars axially with respect to the low-pressure compressor shaft, wherein the one-piece bladed disk comprises a plurality of blades which are made in a single part with a disk portion, said disk portion being adapted to be shrunk onto a low-pressure compressor shaft, wherein said disk portion comprises a profiled body with a generally frustoconical shape and an attachment web which extends as a truncated cone inside the body, from a median zone of the body, downstream, said attachment web terminating in a cylindrical splined collar which is designed to be engaged in a corresponding zone of the low-pressure compressor shaft and to cooperate with complementary splines of said low-pressure compressor shaft to block the relative rotation of said low-pressure compressor shaft and of said collar and including a heel which protrudes, upstream of said attachment collar, as well as a support zone which terminates the collar downstream of the splines, the heel and said support zone being configured to ensure, with complementary zones of the shaft, cylinder/cylinder support and, with the complementary zones of an upstream clamping member and of a heel of a cylindrical collar of a low-pressure compressor rotor downstream, axial supports upstream and downstream of the splines, wherein the low-pressure compressor rotor includes the attachment collar including the set of splines adapted to cooperate with the set of splines of the low-pressure compressor shaft, in order to block the relative rotation of the attachment collar with respect to the low-pressure compressor shaft when the rotor of the low-pressure compressor is shrunk onto the low-pressure compressor shaft, the heel which protrudes upstream of said attachment collar, a downstream support zone configured to cooperate with a complementary support zone of the low-pressure compressor shaft to ensure a cylinder/cylinder support which ensures that the rotor of the low-pressure compressor and the low-pressure compressor shaft are coaxial, wherein said low-pressure compressor rotor includes at least two stages of movable blades and in that the support zone is configured to also ensure axial support with a shoulder on the low-pressure compressor shaft, and wherein the low-pressure compressor shaft includes a shoulder configured to ensure axial support with the support zone of a collar of the low-pressure compressor rotor.

3. The assembly according to claim 2, wherein the different sets of splines distributed on the low-pressure compressor shaft are stepped on different diameters of the low-pressure compressor shaft, the different attachment collars and their splines having complementary dimensions.

4. The assembly according to claim 2, wherein a clamping member is a nut.

5. The assembly according to claim 2, further comprising at least one internal spline for blocking the low-pressure compressor shaft during clamping.

6. The assembly according to claim 2, wherein the sets of splines are stepped on different diameters of the low-pressure compressor shaft.

7. A turbomachine comprising an assembly according to claim 2.

* * * * *